(12) United States Patent
Suyama

(10) Patent No.: US 11,647,703 B2
(45) Date of Patent: May 16, 2023

(54) CABLE USE SYSTEM, OVERHEAD MOVING DEVICE, AND CABLE USE METHOD

(71) Applicant: TOYOTA JIDOSHA KABUSHIKI KAISHA, Toyota (JP)

(72) Inventor: Kazuo Suyama, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 148 days.

(21) Appl. No.: 17/365,431

(22) Filed: Jul. 1, 2021

(65) Prior Publication Data

US 2022/0104439 A1    Apr. 7, 2022

(30) Foreign Application Priority Data

Oct. 6, 2020 (JP) .............................. JP2020-169287

(51) Int. Cl.
*A01G 23/00* (2006.01)
*B66C 21/00* (2006.01)
*A01G 23/091* (2006.01)

(52) U.S. Cl.
CPC ......... *A01G 23/003* (2013.01); *A01G 23/091* (2013.01); *B66C 21/00* (2013.01)

(58) Field of Classification Search
CPC .. A01G 23/003; A01G 23/091; A01G 23/093; A01G 3/085; B66C 21/00; B66C 21/02; B66C 21/06; B66C 21/08
See application file for complete search history.

(56) References Cited

U.S. PATENT DOCUMENTS 3,406,833 A * 10/1968 Read .................... A01G 23/003
                                                           191/11
2020/0305361 A1   10/2020 Suyama et al.

FOREIGN PATENT DOCUMENTS

| CN | 106945124 A | 7/2017 | |
| CN | 110573449 B * | 10/2021 | ............. A01D 34/86 |
| DE | 102020105647 A1 | 10/2020 | |
| JP | 2004-255859 A | 9/2004 | |
| JP | 3811050 B2 * | 8/2006 | |
| JP | 2007-116901 A | 5/2007 | |
| JP | 2008-109918 A | 5/2008 | |
| JP | 3162428 U * | 9/2010 | |
| RU | 2014777 C1 * | 6/1994 | |

* cited by examiner

*Primary Examiner* — Emmanuel M Marcelo
(74) *Attorney, Agent, or Firm* — Sughrue Mion, PLLC

(57) ABSTRACT

A cable use system includes a plurality of support posts, a cable supported by the support posts, a winding device configured to wind the cable, a hoisting device coupled to the cable and configured to move in an air when the cable is wound by the winding device, and a cutting device hung from the hoisting device. The cutting device includes a cutting unit configured to cut a surface side of a tree all around.

5 Claims, 7 Drawing Sheets

US 11,647,703 B2

CABLE USE SYSTEM, OVERHEAD MOVING DEVICE, AND CABLE USE METHOD

CROSS-REFERENCE TO RELATED APPLICATION

This application claims priority to Japanese Patent Application No. 2020-169287 filed on Oct. 6, 2020, incorporated herein by reference in its entirety.

BACKGROUND

1. Technical Field

The disclosure relates to a technology for cutting part of a tree by using cables.

2. Description of Related Art

Japanese Unexamined Patent Application Publication No. 2008-109918 (JP 2008-109918 A) describes a thinned wood transport system that transports thinned wood from a logging site to an unloading site. The thinned wood transport system includes a tower yarder placed near the unloading site on a work road, a first winch installed in the tower yarder to wind a first wire, a second winch installed in the tower yarder to wind a second wire, a plurality of pulleys coupled in the middle of a traveling route of the second wire to change a traveling direction of the second wire, a loading tool that hooks thinned wood, and a plurality of zigzag pulleys coupled in the middle of a traveling route of the loading tool to change the traveling direction of the loading tool.

SUMMARY

Work to enter a forest and thin trees needs efforts of operators. In a poorly managed forest, trees not subjected to thinning can also be narrow and, therefore, there are concerns that such trees may become weak against wind and snow, or the like, and die down if many trees around narrow trees are excessively removed at a time.

The disclosure provides a technology to stably facilitate the growth of remaining trees while reducing an effort to thin trees.

An aspect of the disclosure relates to a cable use system. The cable use system includes a plurality of support posts, a cable supported by the support posts, a winding device configured to wind the cable, a hoisting device coupled to the cable and configured to move in an air when the cable is wound by the winding device, and a cutting device hung from the hoisting device. The cutting device includes a cutting unit configured to cut a surface side of a tree all around.

Another aspect of the disclosure relates to an overhead moving device hung from the cable supported by support posts and configured to move in an air when the cable is wound. The overhead moving device includes a hoisting device coupled to the cable and a cutting device hung from the hoisting device. The cutting device includes a cutting unit configured to cut a surface side of a tree all around.

Further another aspect of the disclosure relates to a cable use method using a cable use system. The cable use system includes a winding device configured to wind a cable supported by support posts, a hoisting device coupled to the cable and configured to move in an air when the cable is wound by the winding device, a holding device hung from the hoisting device, and a cutting device hung from the hoisting device. The cable use method includes holding a tree by the holding device, and cutting a surface side of the tree by the cutting device all around.

According to the aspects of the disclosure, it is possible to provide a technology to stably facilitate the growth of remaining trees while reducing an effort to thin trees.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
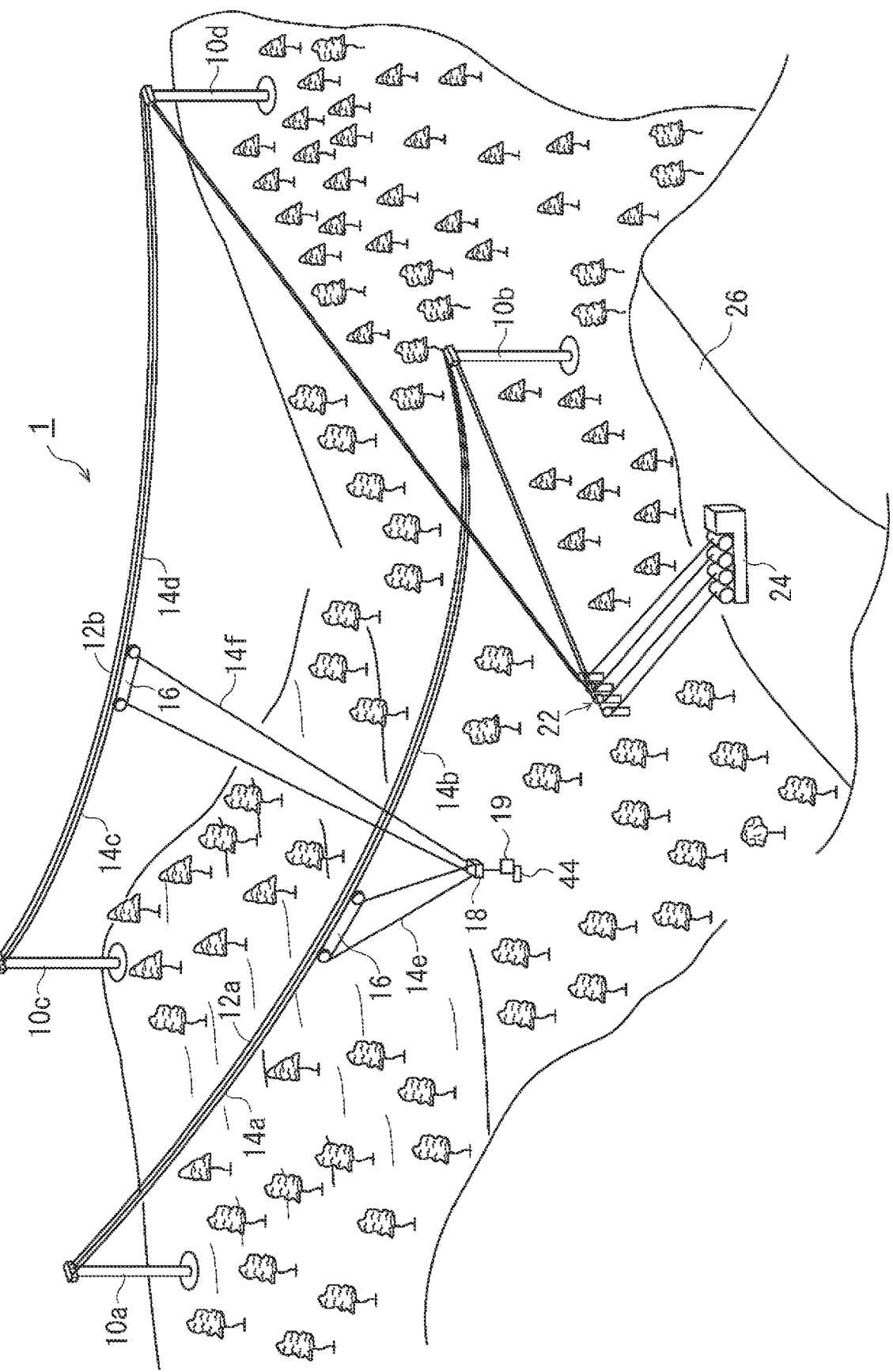
FIG. 1 is a view for illustrating a cable use system.

FIG. 1 is a view for illustrating a cable use system 1. The cable use system 1 includes a first support post 10a, a second support post 10b, a third support post 10c, and a fourth support post 10d (each will be referred to as support post 10 when they are not distinguished from one another), a first main cable 12a, a second main cable 12b (each will be referred to as main cable 12 when they are not distinguished from each other), a first operation cable 14a, a second operation cable 14b, a third operation cable 14c, a fourth operation cable 14d, a fifth operation cable 14e, a sixth operation cable 14f (each will be referred to as operation cable 14 when they are not distinguished from one another), a first moving device 16a, a second moving device 16b (each will be referred to as moving device 16 when they are not distinguished from each other), a hoisting device 18, guide pulleys 22, a winch 24, and a cutting device 44.

The cable use system 1 is a so-called H-shaped cable use system and is capable of hoisting trees logged in a forest with the main cables 12 and the operation cables 14 stretched in the air and transporting the trees to near a yarding site 26. Thus, trees are transported from a forest even when there is no road. The cable use system 1 includes the cutting device 44, so the cable use system 1 is capable of subjecting trees to girdling treatment by cutting the surface sides of the trees.

The four support posts 10 are erected at positions suitable for installation and determined based on the arrangement of standing trees and the position of the yarding site 26. The size of each support post 10 is set to the range of about five meters to 10 meters according to the size and the like of the cable use system 1.

Each of the main cables 12 and the operation cables 14 is fixed to the support post 10 as a cable or wrapped around a pulley of the support post 10. The first main cable 12a is fixed to the first support post 10a and the second support post 10b. The second main cable 12b is fixed to the third support post 10c and the fourth support post 10d. The first main cable 12a and the second main cable 12b function as rails in the air. The first main cable 12a and the second main cable 12b are provided so as not to intersect with each other. The length of each main cable 12 is set to a range from about 300 meters to about 2000 meters.

The operation cable 14 functions as a running cable to be wound by the moving device 16 or the winch 24. The first operation cable 14a, the second operation cable 14b, the third operation cable 14c, and the fourth operation cable 14d are routed through the pulleys respectively provided at the support posts 10. One end of each of the first operation cable 14a, the second operation cable 14b, the third operation cable 14c, and the fourth operation cable 14d is coupled to an associated one of the moving devices 16, and the other end is coupled to the winch 24. The first operation cable 14a is routed from the winch 24 and coupled to the first moving device 16a via the second support post 10b and the first support post 10a. The second operation cable 14b is routed from the winch 24 and coupled to the first moving device 16a via the second support post 10b. The third operation cable 14c is routed from the winch 24 and coupled to the second moving device 16b via the fourth support post 10d and the third support post 10c. The fourth operation cable 14d is routed from the winch 24 and coupled to the second moving device 16b via the fourth support post 10d. The fifth operation cable 14e and the sixth operation cable 14f are each coupled to the hoisting device 18 and an associated one of the moving devices 16.

The moving devices 16 are respectively supported by the main cables 12 and are movable along the main cables 12. The first operation cable 14a, the second operation cable 14b, and the fifth operation cable 14e are coupled to the first moving device 16a. The third operation cable 14c, the fourth operation cable 14d, and the sixth operation cable 14f are coupled to the second moving device 16b. The fifth operation cable 14e couples the first moving device 16a and the hoisting device 18. The sixth operation cable 14f couples the second moving device 16b and the hoisting device 18. The moving devices 16 have the function to wind and unwind the fifth operation cable 14e and the sixth operation cable 14f in accordance with a wirelessly transmitted command signal.

The hoisting device 18 is coupled to a holding device 19 by a wire for lifting and lowering. The cutting device 44 is attached to the holding device 19. The holding device 19 and the cutting device 44 are hung from the hoisting device 18. Each of the guide pulleys 22 changes the direction of the wrapped operation cable 14. The winch 24 functions as a winch to wind each of the operation cables 14 and has drums and drive sources for winding or unwinding the operation cables 14, respectively.

The operation of the cable use system 1 will be described. The winch 24 winds one of the first operation cable 14a and the second operation cable 14b and unwinds the other one to move the first moving device 16a along the first main cable 12a. In addition, the winch 24 winds one of the third operation cable 14c and the fourth operation cable 14d and unwinds the other one to move the second moving device 16b along the second main cable 12b. Thus, the hoisting device 18 is displaced along the main cables 12.

The moving devices 16 wind one of the fifth operation cable 14e and the sixth operation cable 14f and unwind the other one to cause the hoisting device 18 to move between the first moving device 16a and the second moving device 16b. Thus, the hoisting device 18 is moved in a horizontal direction within a region surrounded by the four support posts 10.

In this way, the winch 24 and the moving devices 16 function as a winding device capable of winding cables. The winding device enables the hoisting device 18 to move in the horizontal direction in the air by winding the operation cables 14 (cables).

In the configuration of the cable use system 1 shown in FIG. 1, the moving devices 16 that respectively wind the fifth operation cable 14e and the sixth operation cable 14f are respectively coupled to the main cables 12; however, the cable use system 1 is not limited to this configuration. When the fifth operation cable 14e and the sixth operation cable 14f are extended to the position of the winch 24, the winch 24 has the function to wind the moving devices 16. The winch 24 is not limited to the configuration in which individual winches are concentrated at one location. The winch 24 may be configured such that individual winches are provided one by one at the support posts 10. In this way, the winding device may be integrated or separated.

Figure 2:
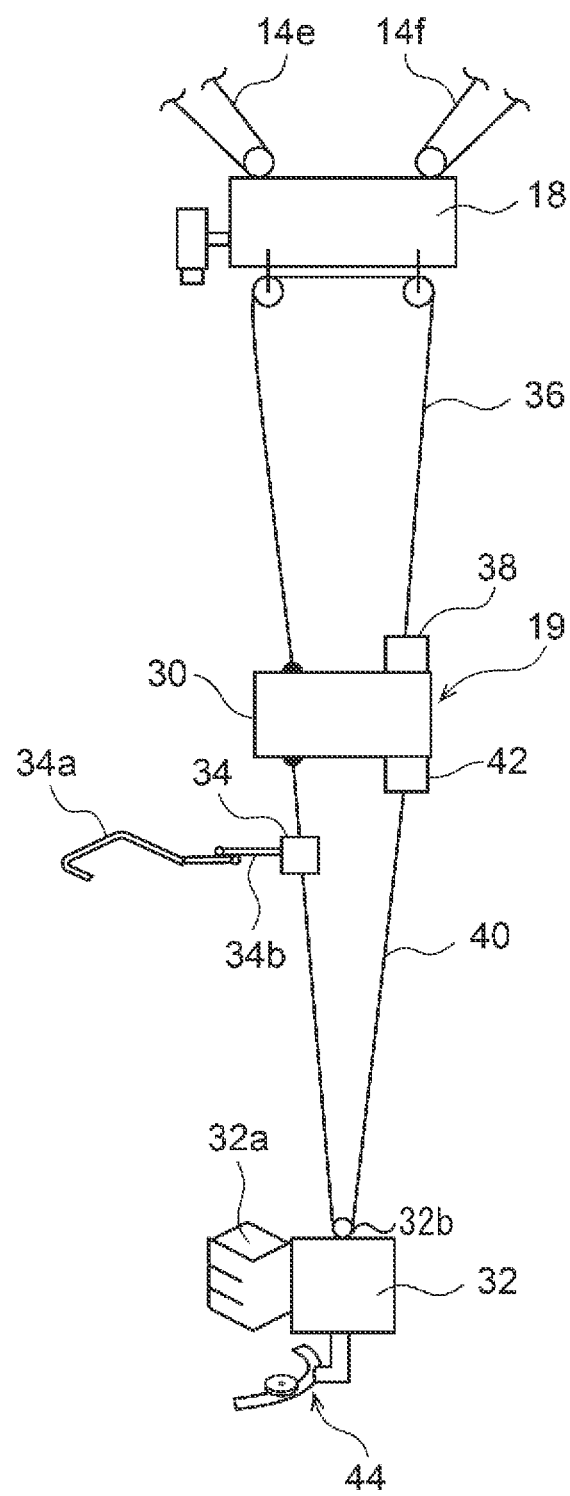
FIG. 2 is a view for illustrating a holding device and a cutting device both hung from a hoisting device.

FIG. 2 is a view for illustrating the holding device 19 and the cutting device 44 both hung from the hoisting device 18. The hoisting device 18, the holding device 19, and the cutting device 44 make up an overhead moving device 17. The overhead moving device 17 moves in the air when the cables are wound. The hoisting device 18 is coupled to the fifth operation cable 14e and the sixth operation cable 14f. The holding device 19 is hung from the hoisting device 18 by a first wire 36.

The holding device 19 includes an actuator 30, a first holding unit 32, a second holding unit 34, the first wire 36, a second wire 40, a first motor 38, and a second motor 42. The actuator 30, the first holding unit 32, the second holding unit 34, the first motor 38, and the second motor 42 are remotely controllable and controlled by a controller (described later).

One end of the first wire 36 is fixed to the actuator 30, and the other end side of the first wire 36 is coupled to the actuator 30 so as to be wound and unwound. The first wire 36 is coupled to the hoisting device 18 via pulleys. The first motor 38 is provided on the actuator 30 and is capable of winding and unwinding the first wire 36. The holding device 19 moves in an up and down direction with respect to the hoisting device 18 by driving the first motor 38.

The first holding unit 32 and the second holding unit 34 are hung by the second wire 40 from the actuator 30. One end of the second wire 40 is fixed to the actuator 30, the middle part of the second wire 40 is coupled to the first holding unit 32 via a pulley 32b provided on the first holding unit 32, and the other end of the second wire 40 is coupled to the actuator 30 such that the second wire 40 can be wound and unwound. The second motor 42 is provided on the actuator 30 and is capable of winding and unwinding the second wire 40. The first holding unit 32 moves in the up and down direction with respect to the actuator 30 by driving the second motor 42.

The first holding unit 32 includes a pair of clamping portions 32a and the pulley 32b. The pair of clamping portions 32a can be driven to close and open and clamps the outer periphery of a tree. The pair of clamping portions 32a approaches a tree in an open state and closes to clamp the tree.

The second holding unit 34 is a manipulator and is fixed to the second wire 40. The second holding unit 34 is provided between the actuator 30 and the first holding unit 32 and is located above the first holding unit 32. The second holding unit 34 includes a grip portion 34a and an arm portion 34b. The grip portion 34a is located at the distal end portion of the second holding unit 34 and grips the outer periphery of a tree. The arm portion 34b has a plurality of joints. The arm portion 34b is capable of bringing the grip portion 34a close to a tree by moving in a direction away from the second wire 40. After the grip portion 34a holds the tree, the arm portion 34b contracts to bring the grip portion 34a close to the second wire 40. Thus, the first holding unit 32 and the cutting device 44 approach the tree. The first holding unit 32 and the second holding unit 34 are capable of holding a logged tree and transport the tree in the air through winding of the winding device.

The holding device 19 is capable of moving the actuator 30 up and down by driving the first motor 38 and is capable of moving the first holding unit 32 up and down by driving the second motor 42. Thus, the first holding unit 32 and the second holding unit 34 each can be caused to hold a tree at an adequate position. The cutting device 44 is provided on the lower part of the first holding unit 32.

Figure 3:
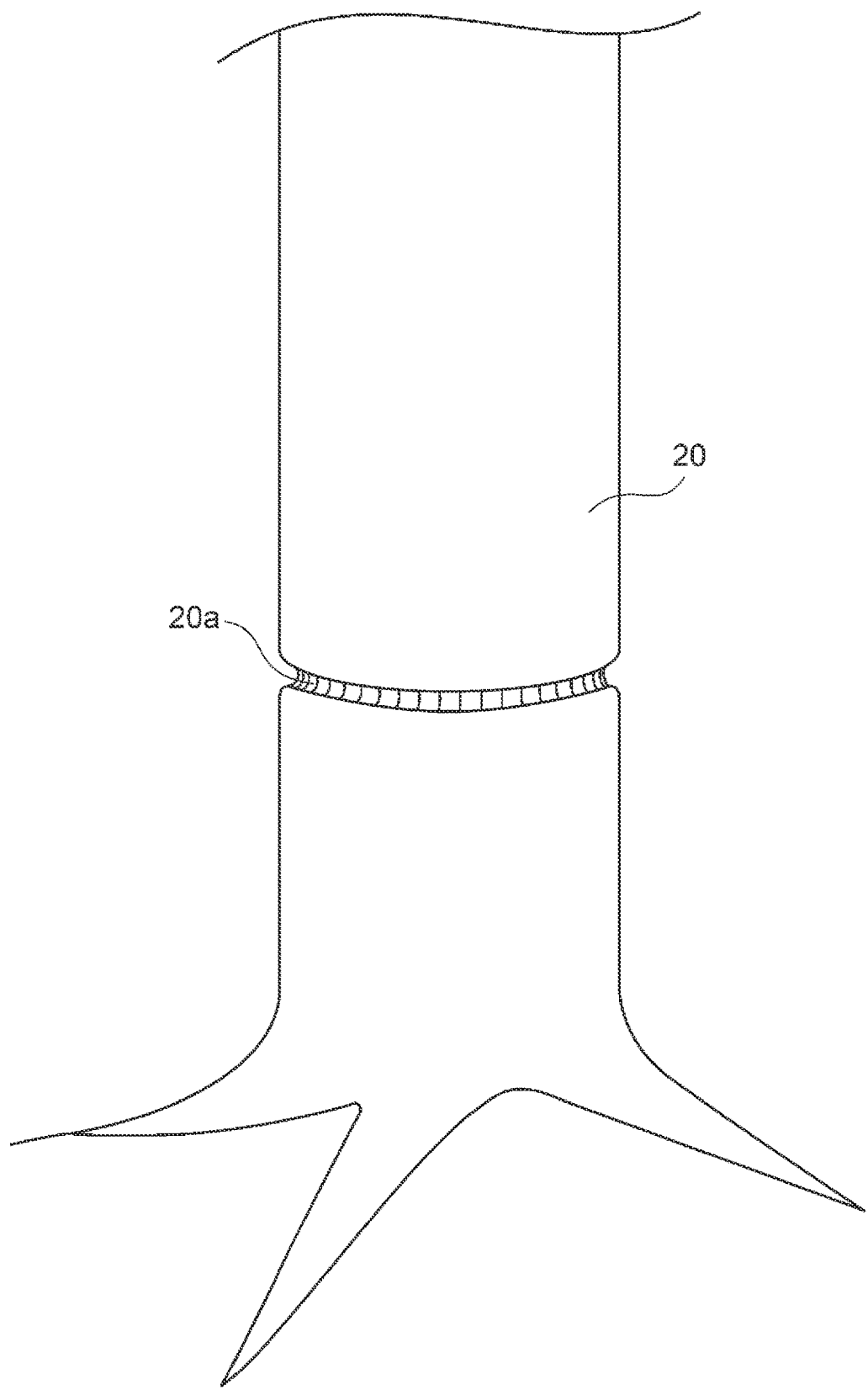
FIG. 3 is a view showing a tree subjected to girdling treatment by the cutting device.

FIG. 3 is a view showing a tree 20 subjected to girdling treatment by the cutting device 44. A slit portion 20a is formed so as to extend all around the outer periphery of the tree 20. The slit portion 20a is formed by cutting the surface side of the tree 20 all around with the cutting device 44.

Figure 4:
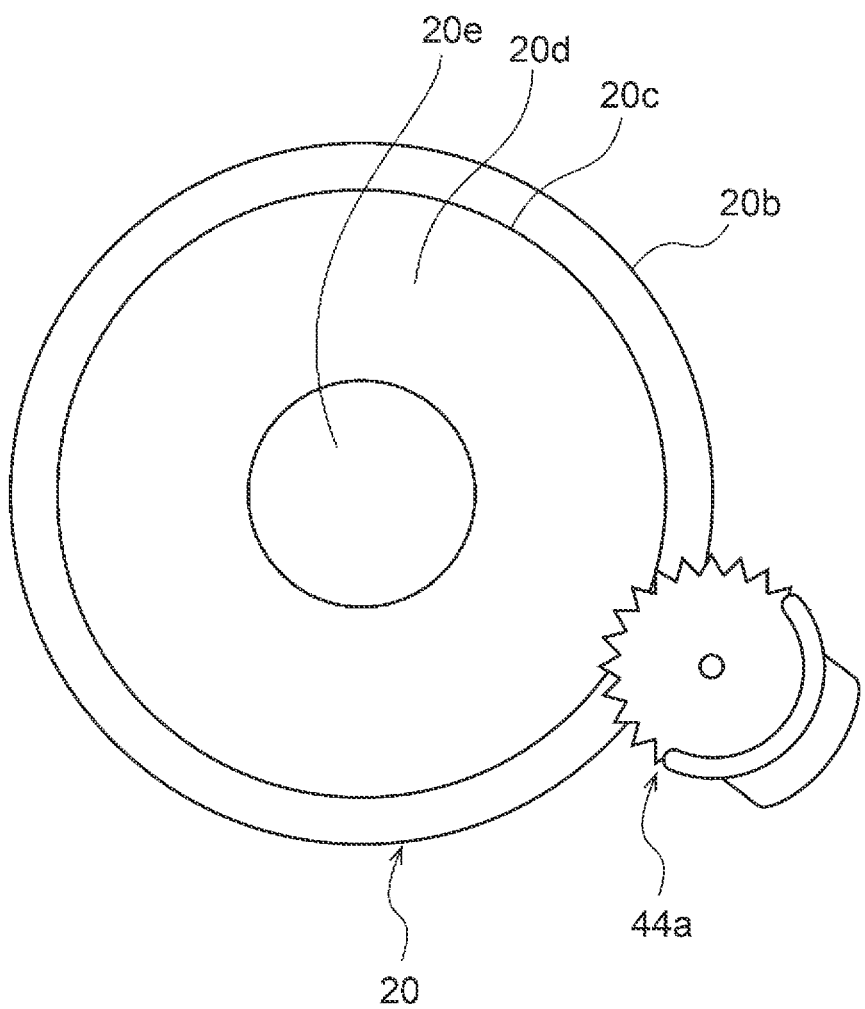
FIG. 4 is a view for illustrating a cut depth of girdling treatment and showing the cross section of the tree.

FIG. 4 is a view for illustrating a cut depth of girdling treatment and showing the cross section of the tree 20. The tree 20 has a surface 20b, a cambium 20c, a sapwood 20d, and a heartwood 20e in order from the outside. The cambium 20c is on the surface side of the tree 20 and is located around the sapwood 20d.

In girdling treatment, the cambium 20c is cut all around by the cutting unit 44a. When the tree 20 does not fall down, the sapwood 20d may be cut in to a certain extent, and it is desirable to leave the heartwood 20e such that the tree 20 does not fall down.

When the cambium 20c is cut all around, the tree 20 cannot absorb nutrients taken in from a ground to above the slit portion 20a and dies down while standing. For this reason, the tree 20 dies down and is removed over time, so it is possible to stably grow desired trees while reducing influences on remaining trees in comparison with the case where thinning of a large number of trees 20 is performed at a time. The trees 20 subjected to girdling treatment are capable of supporting other trees while dying down, so other trees grow while maintaining a state where the other trees can stand wind and snow, and the like.

Figure 5:
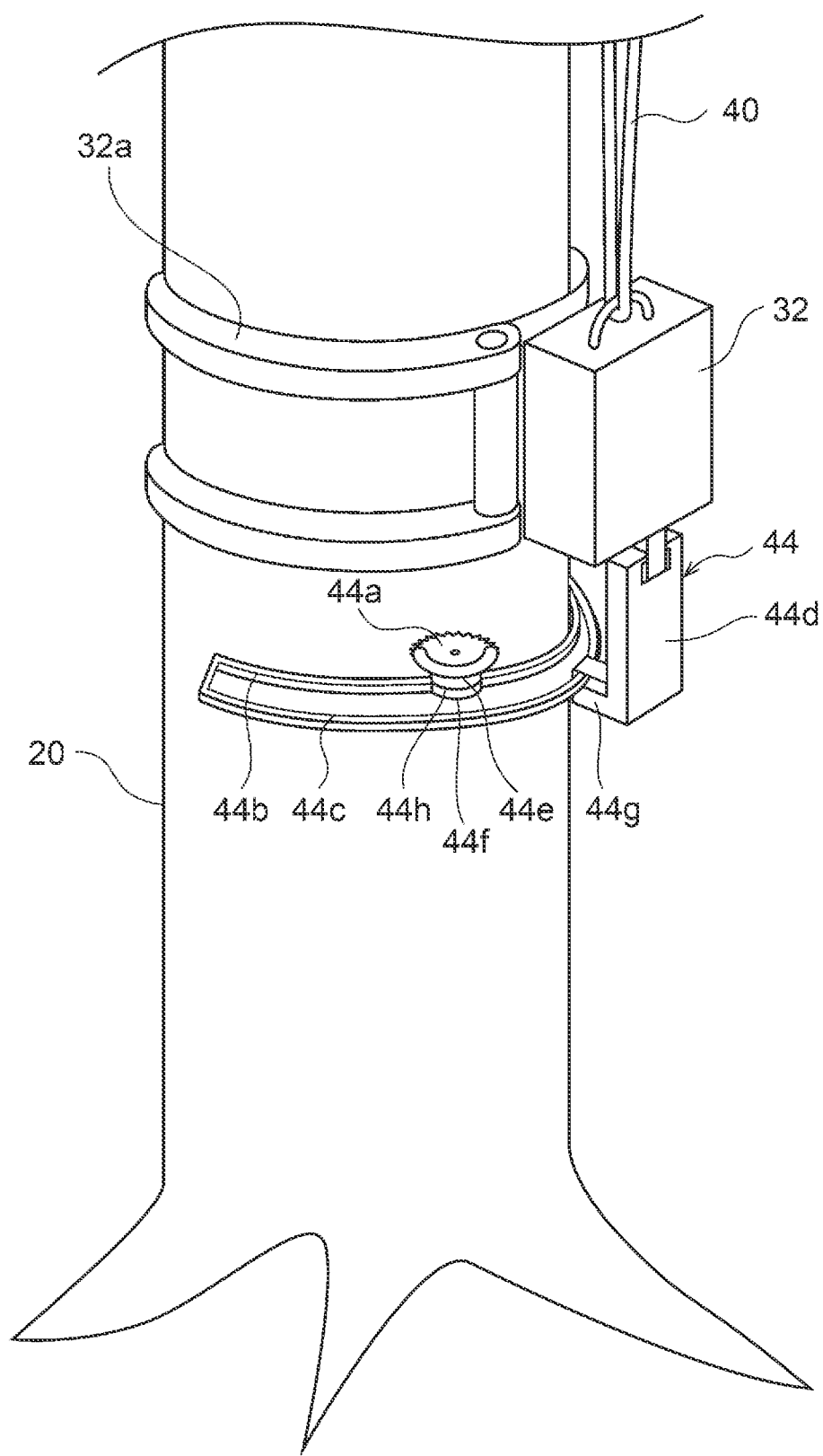
FIG. 5 is a view for illustrating the cutting device.

FIG. 5 is a view for illustrating the cutting device 44. In FIG. 5, a state where the cutting device 44 is cutting the surface side of the tree 20 is shown, and the first holding unit 32 is holding the tree 20. The cutting device 44 includes the cutting unit 44a, a first rail portion 44b, a second rail portion 44c, a supporting portion 44d, an urging portion 44e, a first drive unit 44f, a second drive unit 44g, and a rotary mechanism 44h.

The cutting unit 44a is an electrically-powered circular saw and is capable of cutting the surface side of the tree 20. When the cutting unit 44a cuts in the tree 20 to a predetermined depth, the housing of the cutting unit 44a contacts the surface of the tree 20 and is stopped to cut in toward the center of the tree 20. In other words, the housing of the cutting unit 44a functions as a stopper that stops cutting in toward the center of the tree 20 at or greater than a predetermined distance. The cutting unit 44a may be a chain saw. The cutting unit 44a is slidably supported by the first rail portion 44b. The cutting unit 44a is equipped with the first drive unit 44f for sliding along the first rail portion 44b.

The first rail portion 44b and the second rail portion 44c are curved along the circumferential direction of the tree 20 and formed in a circular arc shape. The first rail portion 44b and the second rail portion 44c are provided parallel to each other. The first rail portion 44b and the second rail portion 44c are coupled as one unit and are slidable with respect to the first holding unit 32 and the supporting portion 44d. The first rail portion 44b is located on a radially inner side, and the second rail portion 44c is located on a radially outer side. The length of each of the first rail portion 44b and the second rail portion 44c is set to about a range of 180 degrees to 200 degrees in rotation angle. The radius of curvature of the first rail portion 44b is set so as to be greater than the radius of the tree 20.

The supporting portion 44d supports the second rail portion 44c such that the second rail portion 44c is slidable. The supporting portion 44d is equipped with the second drive unit 44g for sliding the second rail portion 44c. The upper end of the supporting portion 44d is coupled to the first holding unit 32.

The rotary mechanism 44h is provided between the cutting unit 44a and the first drive unit 44f. The rotary mechanism 44h is, for example, capable of rotating along the horizontal direction and moving the cutting unit 44a toward a radially inner side with respect to the first drive unit 44f. Through rotation of the rotary mechanism 44h, the cutting unit 44a can be placed at two positions, that is, a state where the cutting unit 44a contacts with the tree 20 and a state where the cutting unit 44a is spaced apart from the tree 20. A rotation axis of the rotary mechanism 44h is not limited to a vertical direction and may be a tangential direction of the first rail portion 44b.

The urging portion 44e urges the cutting unit 44a radially inward, that is, urges the cutting unit 44a in a direction to approach the tree 20. The urging portion 44e is provided in the rotary mechanism 44h and urges the cutting unit 44a in a rotation direction of the rotary mechanism 44h. With the urging portion 44e, a state where the cutting unit 44a is pressed against the surface side of the tree 20 is maintained. The urging portion 44e is a spring member and urges the cutting unit 44a radially inward with a predetermined load or greater. With the urging portion 44e, the cutting unit 44a can be pressed against the tree 20 with a low-cost configuration. A component to press the cutting unit 44a against the tree 20 is not limited to the urging portion 44e. The cutting unit 44a may be moved radially inward through motor control to be pressed against the tree 20.

The operation of the cutting device 44 will be described. After the first holding unit 32 holds the tree 20, the cutting unit 44a is set at one end of the first rail portion 44b, the supporting portion 44d is set at the other end of the second rail portion 44c, and the drive of the cutting unit 44a is started. In other words, at the time of the start of drive of the cutting unit 44a, the cutting unit 44a is located on the back side of the tree 20 away from the supporting portion 44d.

Subsequently, the rotary mechanism 44h is driven, the cutting unit 44a is brought into contact with the tree 20, and is urged by the urging portion 44e toward the tree 20. In a state where the cutting unit 44a is pressed against the tree 20, the second rail portion 44c slides relative to the supporting portion 44d by the second drive unit 44g. Thus, the cutting unit 44a moves in the circumferential direction together with the second rail portion 44c and cuts the surface side of the tree 20 over the range of 180 degrees or greater.

After the second drive unit 44g slides from the other end of the second rail portion 44c to one end, the slide caused by the second drive unit 44g ends, and the first drive unit 44f starts sliding on the first rail portion 44*b*. When the slide of the second drive unit 44*g* completes, the cutting unit 44*a* is located near the supporting portion 44*d*. After the first drive unit 44*f* slides from one end of the first rail portion 44*b* to the other end, the cutting unit 44*a* completes moving all around the tree 20, so the drive is stopped, and girdling treatment ends.

Since the slide of the first drive unit 44*f* along the first rail portion 44*b* and the slide of the second drive unit 44*g* along the second rail portion 44*c* each are movement over a rotation angle greater than or equal to 180 degrees, the cutting unit 44*a* is capable of cutting the surface side of the tree 20 all around.

In this way, the first drive unit 44*f* and the second drive unit 44*g* (each will be referred to as drive unit when they are not distinguished from each other) move the cutting unit 44*a* in the circumferential direction. Each of the first rail portion 44*b* and the second rail portion 44*c* (each will be referred to as rail portion when they are not distinguished from each other) is capable of guiding movement of the cutting unit 44*a* in the circumferential direction by an associated one of the drive units 44*f*, 44*g*.

Figure 6C:
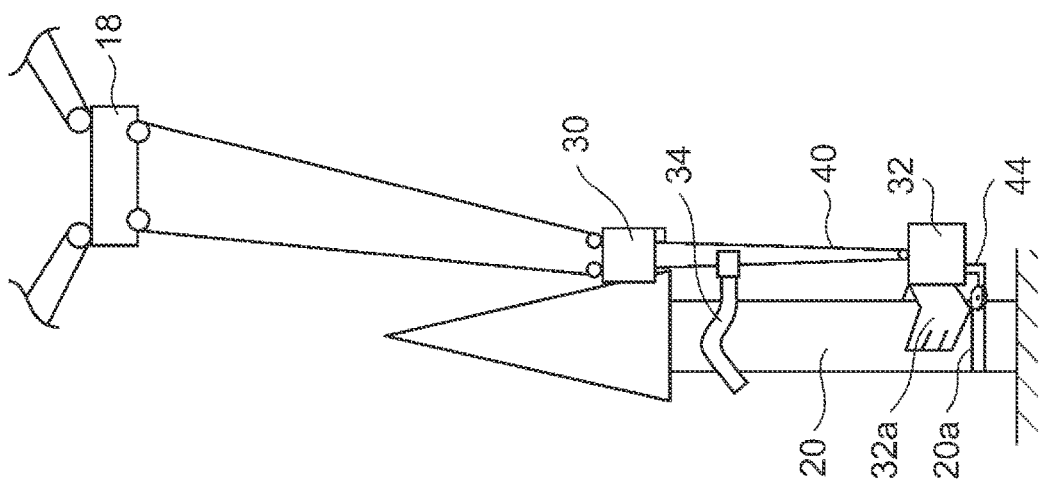
FIG. 6C is a view illustrating the operation of the cable use system including the cutting device.
Figure 6B:
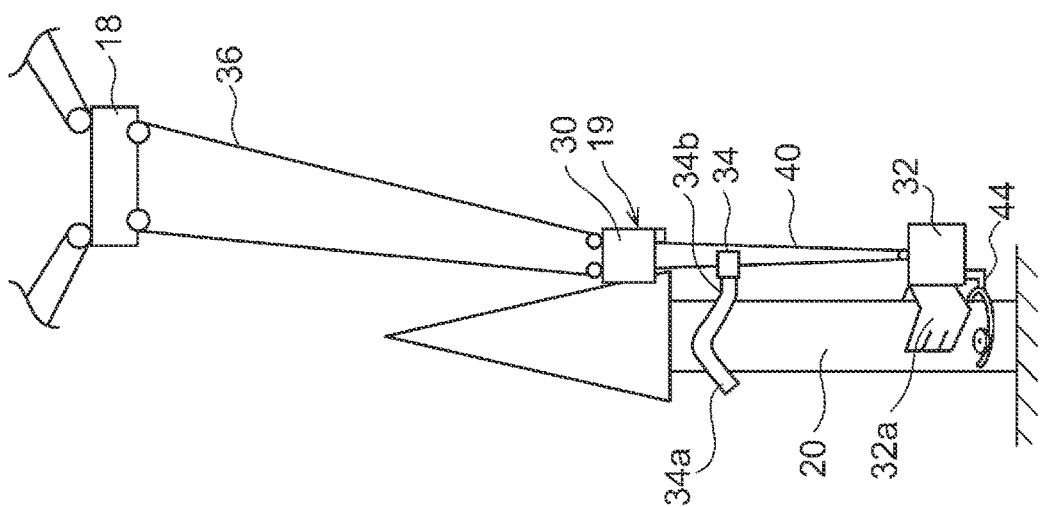
FIG. 6B is a view illustrating the operation of the cable use system including the cutting device.
Figure 6A:
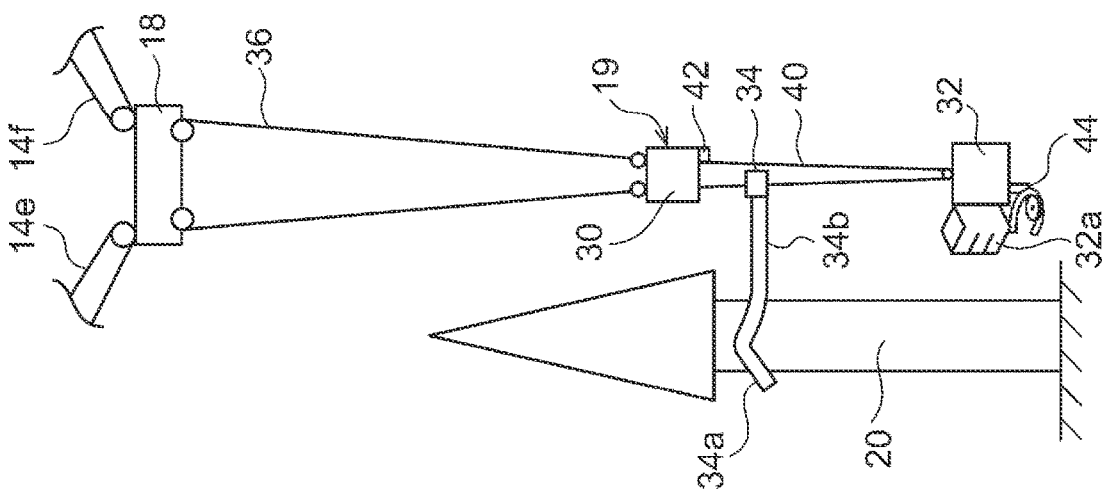
FIG. 6A is a view illustrating the operation of the cable use system including the cutting device.

FIG. 6A, FIG. 6B, and FIG. 6C are views illustrating the operation of the cable use system 1 including the cutting device 44. FIG. 6A shows a state where the hoisting device 18 is positioned near the tree 20 and the holding device 19 is lowered to a position of a proximal side of the tree 20. The grip portion 34*a* of the second holding unit 34 is holding the tree 20.

Control to lower the holding device 19 and control to cause the second holding unit 34 to hold the tree 20 may be executed by a program provided in advance or may be executed by operation of an operator. Alternatively, control of the cable use system 1 may be a combination of a program and operation of an operator. For example, an operator controls the cable use system 1 while watching an image transmitted from a camera provided at the hoisting device 18, the actuator 30, or the like.

FIG. 6B shows a state where the arm portion 34*b* is driven to contract and the first holding unit 32 is close to the tree 20. The holding device 19 shifts in the horizontal direction with respect to the hoisting device 18. When the first holding unit 32 is close to the tree 20, the pair of clamping portions 32*a* clamps the proximal side of the tree 20. The first holding unit 32 holds the proximal side of the tree 20. The second holding unit 34 holds part of the tree 20 above the first holding unit 32. Thus, the first holding unit 32 and the second holding unit 34 hold the tree 20 at two points. When the first holding unit 32 holds the tree 20, the first rail portion 44*b* and second rail portion 44*c* of the cutting device 44 are placed to surround the tree 20.

In FIG. 6C, the cutting device 44 is driven in a state where the first holding unit 32 and the second holding unit 34 are holding the tree 20, to form the slit portion 20*a* all around the tree 20. In this way, the tree 20 is subjected to girdling treatment. A plurality of the slit portions 20*a* may be formed at multiple points separated from each other in the up and down direction. Thus, the tree 20 can be caused to die down over time without immediately causing the tree 20 to fall down as an object to be thinned.

Figure 7:
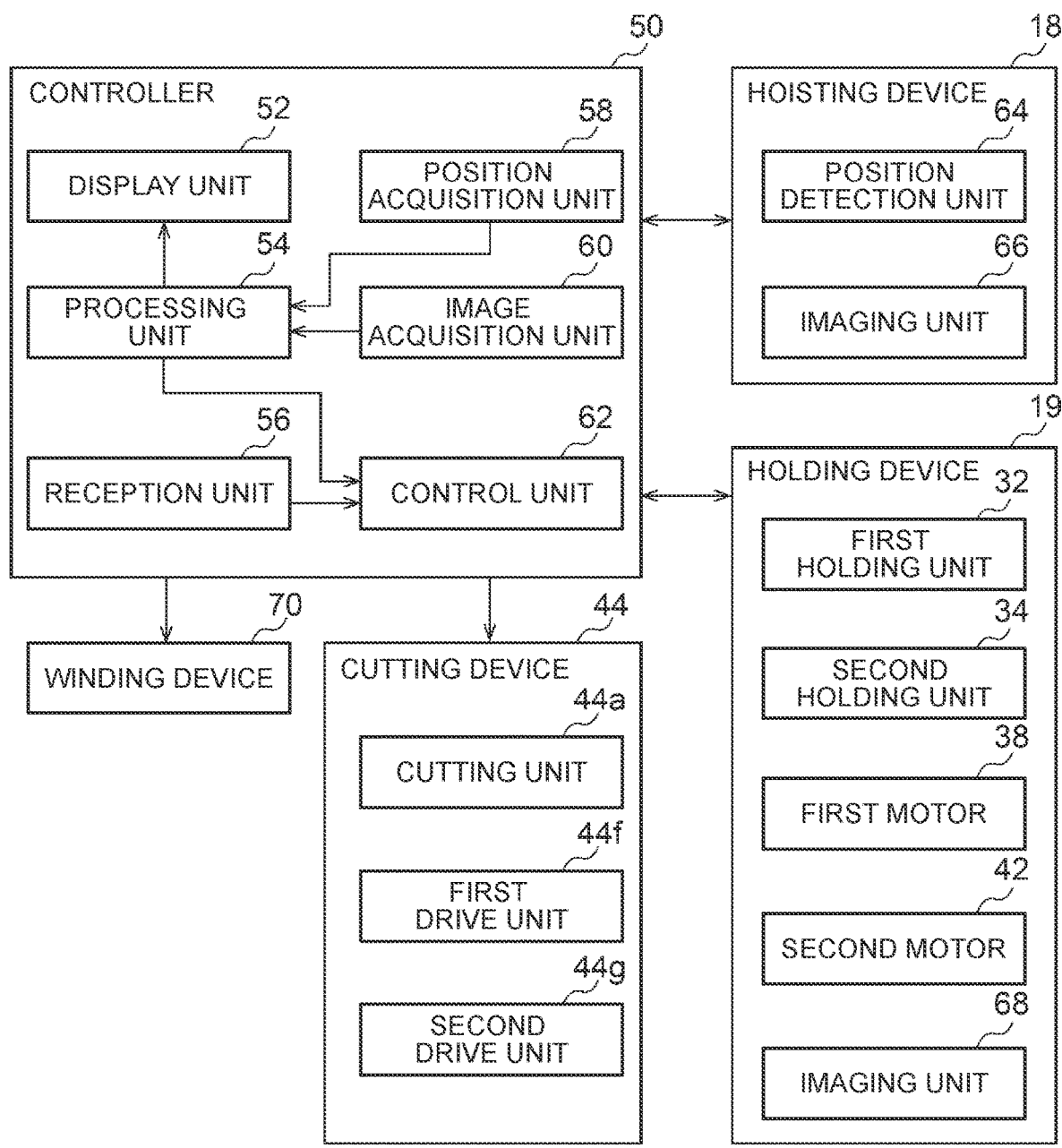
FIG. 7 is a diagram showing the schematic configuration of the cable use system.

FIG. 7 shows the functional configuration of the cable use system 1. The controller 50 is provided in a control room and enables the winding device 70, the hoisting device 18, the holding device 19, the actuator 30, and the cutting device 44 to be controlled remotely. The winding device 70 includes the winch 24 and the moving devices 16 and is capable of communicating with the controller 50.

The hoisting device 18 includes a position detection unit 64 and an imaging unit 66 and is capable of communicating with the controller 50. The position detection unit 64 detects information about the position of the hoisting device 18 by using a satellite positioning system. The imaging unit 66 is a camera provided at the hoisting device 18. The imaging unit 66 mainly takes an image below the hoisting device 18 and detects a taken image containing the holding device 19.

The holding device 19 includes an imaging unit 68 in addition to the first holding unit 32, the second holding unit 34, the first motor 38, and the second motor 42. The imaging unit 68 is provided at the actuator 30 and takes an image of the first holding unit 32 and an image of the second holding unit 34. The actuator 30, the first holding unit 32, and the second holding unit 34 may be capable of communicating with the controller 50. Alternatively, any one of the actuator 30, the first holding unit 32 and the second holding unit 34 may have a communication function, and the actuator 30, the first holding unit 32, and the second holding unit 34 may be connected by wire or near field communication. In any case, the components of the holding device 19 are capable of exchanging information with the controller 50. The cutting device 44 may wirelessly communicate with the controller 50 or may communicate with the controller 50 by using the communication function of the holding device 19.

The controller 50 includes a display unit 52, a processing unit 54, a reception unit 56, a position acquisition unit 58, an image acquisition unit 60, and a control unit 62. The position acquisition unit 58 acquires information about the position of the hoisting device 18 from the hoisting device 18. The image acquisition unit 60 acquires taken images from the imaging unit 66 and the imaging unit 68, respectively. The imaging unit 68 takes not only the images of the first holding unit 32 and second holding unit 34 but also the image of the cutting device 44. In addition to the imaging unit 66 and the imaging unit 68, further another imaging unit may be provided at the cutting device 44. The reception unit 56 is a touch panel or mechanical controller and receives operation of an operator.

The processing unit 54 generates command information for causing the hoisting device 18 to move to a predetermined position based on the information about the position of the hoisting device 18 and the taken images of the hoisting device 18 and holding device 19. For example, the processing unit 54 generates command information for causing the hoisting device 18 to move to the position of the tree 20 planned to be subjected to girdling. The command information generated by the processing unit 54 is sent to the control unit 62, and control according to the command information is executed.

The processing unit 54 generates a display image to be displayed on the display unit 52, based on the information about the position of the hoisting device 18 and the taken images of the hoisting device 18 and holding device 19. An operator operates the hoisting device 18 and the holding device 19 while watching the information about the position of the hoisting device 18 and the taken images of the hoisting device 18 and holding device 19, displayed on the display unit 52.

When the holding device 19 completes holding a tree, the processing unit 54 generates command information for the cutting unit 44*a*, first drive unit 44*f*, and second drive unit 44*g* of the cutting device 44, and causes the cutting device 44 to perform girdling treatment. The rotary mechanism 44*h* of the cutting device 44 may also be driven in accordance with a command from the controller 50.

In this way, the processing unit 54 automatically moves the hoisting device 18, an operator operates the drive of the holding device 19, and the processing unit 54 automatically drives the cutting device 44. An operator may operate a step in which the second holding unit 34 and the first holding unit 32 hold a tree, and the processing unit 54 may automatically perform the other steps. Alternatively, the processing unit 54 may automatically perform all the tree girdling steps.

The control unit 62 controls the winding device 70, the hoisting device 18, the holding device 19, and the cutting device 44 based on command information from the processing unit 54 or operation information of an operator, input to the reception unit 56. The control unit 62 controls the winding device 70 so as to move the hoisting device 18 to a predetermined position. The control unit 62 controls the holding device 19 in accordance with operation of an operator. The control unit 62 controls the cutting device 44 in accordance with command information generated by the processing unit 54 or operation of an operator.

The disclosure is described with reference to the embodiment. It is to be understood by those skilled in the art that the embodiment is illustrative, that the embodiment may have modifications having various combinations of constituent elements and operation processes, and that the scope of the disclosure also encompasses these modifications.

In the embodiment, the mode in which the first motor 38 for winding the first wire 36 is provided on the holding device 19 is described; however, the configuration is not limited to this mode. For example, the hoisting device 18 may include a motor for winding the first wire 36.

In the embodiment, the mode in which the cutting device 44 moves along the rail portion is described; however, the configuration is not limited to this mode. For example, the cutting unit 44*a* may be fixed to the first holding unit 32, and part of the first holding unit 32 may move all around the tree 20 to move the cutting unit 44*a*.

What is claimed is:

1. A cable use system comprising:
   a plurality of support posts;
   a cable supported by the support posts;
   a winding device configured to wind the cable;
   a hoisting device coupled to the cable, the hoisting device being configured to move in an air when the cable is wound by the winding device; and
   a cutting device hung from the hoisting device, wherein the cutting device includes a cutting unit configured to cut a surface side of a tree all around.

2. The cable use system according to claim 1, wherein the cutting device includes an urging portion configured to urge the cutting unit in a radially inward direction of the tree.

3. The cable use system according to claim 1, wherein the cutting device includes
   a drive unit configured to move the cutting unit in a circumferential direction, and
   a rail portion configured to guide the cutting unit to be moved by the drive unit and formed so as to be curved along the circumferential direction of the tree.

4. An overhead moving device hung from a cable supported by support posts and configured to move in an air when the cable is wound, the overhead moving device comprising:
   a hoisting device coupled to the cable; and
   a cutting device hung from the hoisting device, wherein the cutting device includes a cutting unit configured to cut a surface side of a tree all around.

5. A cable use method using a cable use system that includes a winding device configured to wind a cable supported by support posts, a hoisting device coupled to the cable and configured to move in an air when the cable is wound by the winding device, a holding device hung from the hoisting device, and a cutting device hung from the hoisting device, the cable use method comprising:
   holding a tree by the holding device; and
   cutting a surface side of the tree by the cutting device all around.

\* \* \* \* \*